(12) United States Patent
Nakata

(10) Patent No.: US 6,751,192 B1
(45) Date of Patent: Jun. 15, 2004

(54) NETWORK SYSTEM AND COMMUNICATION METHOD

(75) Inventor: Toru Nakata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/892,891

(22) Filed: Jul. 15, 1997

(30) Foreign Application Priority Data

Jul. 24, 1996 (JP) .............................................. 8-194426

(51) Int. Cl.$^7$ ................................................. H04J 1/16
(52) U.S. Cl. ...................................... 370/222; 370/390
(58) Field of Search ................................ 370/390, 222, 370/395.1, 421, 396, 433, 397, 429, 412, 420, 470, 430, 471, 248, 403, 227, 228; 359/124, 133

(56) References Cited

U.S. PATENT DOCUMENTS

| 4,470,154 | A | | 9/1984 | Yano ........................... 455/607 |
| 4,665,518 | A | | 5/1987 | Champlin et al. ............. 370/89 |
| 4,887,259 | A | | 12/1989 | Morita ......................... 370/60 |
| 5,410,540 | A | * | 4/1995 | Aiki et al. ................... 370/390 |
| 5,710,971 | A | * | 1/1998 | Armbruster et al. ....... 455/12.1 |
| 5,777,762 | A | * | 7/1998 | Yamamoto ................... 359/123 |
| 5,801,859 | A | * | 9/1998 | Yamamoto ................... 359/119 |
| 5,828,669 | A | * | 10/1998 | Yamamoto ................... 370/412 |

FOREIGN PATENT DOCUMENTS

| EP | 0 719 066 | 6/1996 |
| EP | 0 720 323 | 7/1996 |

OTHER PUBLICATIONS

Collora, et al., "Special Edition Using Microsoft Exchange Server", Que Corporation, ©1996, p. 63.

* cited by examiner

Primary Examiner—Huy D. Vu
Assistant Examiner—Alexander O. Boakye
(74) Attorney, Agent, or Firm—Fitzpatrick, Cella, Harper & Scinto

(57) ABSTRACT

Disclosed is a network system for connecting a plurality of node devices by a plurality of parallel transmission channels and connecting terminals to respective ones of the plurality of transmission channels via the node devices. Each node device temporarily stores output packets by allotting the packets to a plurality of storage areas that correspond to respective ones of the plurality of transmission channels. When a stored packet is transmitted by selecting any one of the plurality of transmission channels, control is performed so as to read out the packet that has been stored in the storage area that corresponds to the selected transmission channel. In a case where a stored packet to be transmitted over the plurality of transmission channels is a packet for broadcast, the packet is duplicated by being distributed to the plurality of storage areas that correspond to the plurality of transmission channels that are to transmit the packet.

24 Claims, 11 Drawing Sheets

FIG. 3

| CONTROL ADDRESS / INPUT TERMINAL | A1 | A2 | A3 | A4 | A5 | A6 | A7 | A8 |
|---|---|---|---|---|---|---|---|---|
| IN1 | OUT1 λ1 | OUT2 λ2 | OUT3 λ3 | OUT4 λ4 | OUT5 λ5 | OUT6 λ6 | OUT7 λ7 | OUT8 λ8 |
| IN2 | OUT2 λ2 | OUT3 λ3 | OUT4 λ4 | OUT5 λ5 | OUT6 λ6 | OUT7 λ7 | OUT8 λ8 | OUT1 λ1 |
| IN3 | OUT3 λ3 | OUT4 λ4 | OUT5 λ5 | OUT6 λ6 | OUT7 λ7 | OUT8 λ8 | OUT1 λ1 | OUT2 λ2 |
| IN4 | OUT4 λ4 | OUT5 λ5 | OUT6 λ6 | OUT7 λ7 | OUT8 λ8 | OUT1 λ1 | OUT2 λ2 | OUT3 λ3 |
| IN5 | OUT5 λ5 | OUT6 λ6 | OUT7 λ7 | OUT8 λ8 | OUT1 λ1 | OUT2 λ2 | OUT3 λ3 | OUT4 λ4 |
| IN6 | OUT6 λ6 | OUT7 λ7 | OUT8 λ8 | OUT1 λ1 | OUT2 λ2 | OUT3 λ3 | OUT4 λ4 | OUT5 λ5 |
| IN7 | OUT7 λ7 | OUT8 λ8 | OUT1 λ1 | OUT2 λ2 | OUT3 λ3 | OUT4 λ4 | OUT5 λ5 | OUT6 λ6 |
| IN8 | OUT8 λ8 | OUT1 λ1 | OUT2 λ2 | OUT3 λ3 | OUT4 λ4 | OUT5 λ5 | OUT6 λ6 | OUT7 λ7 |

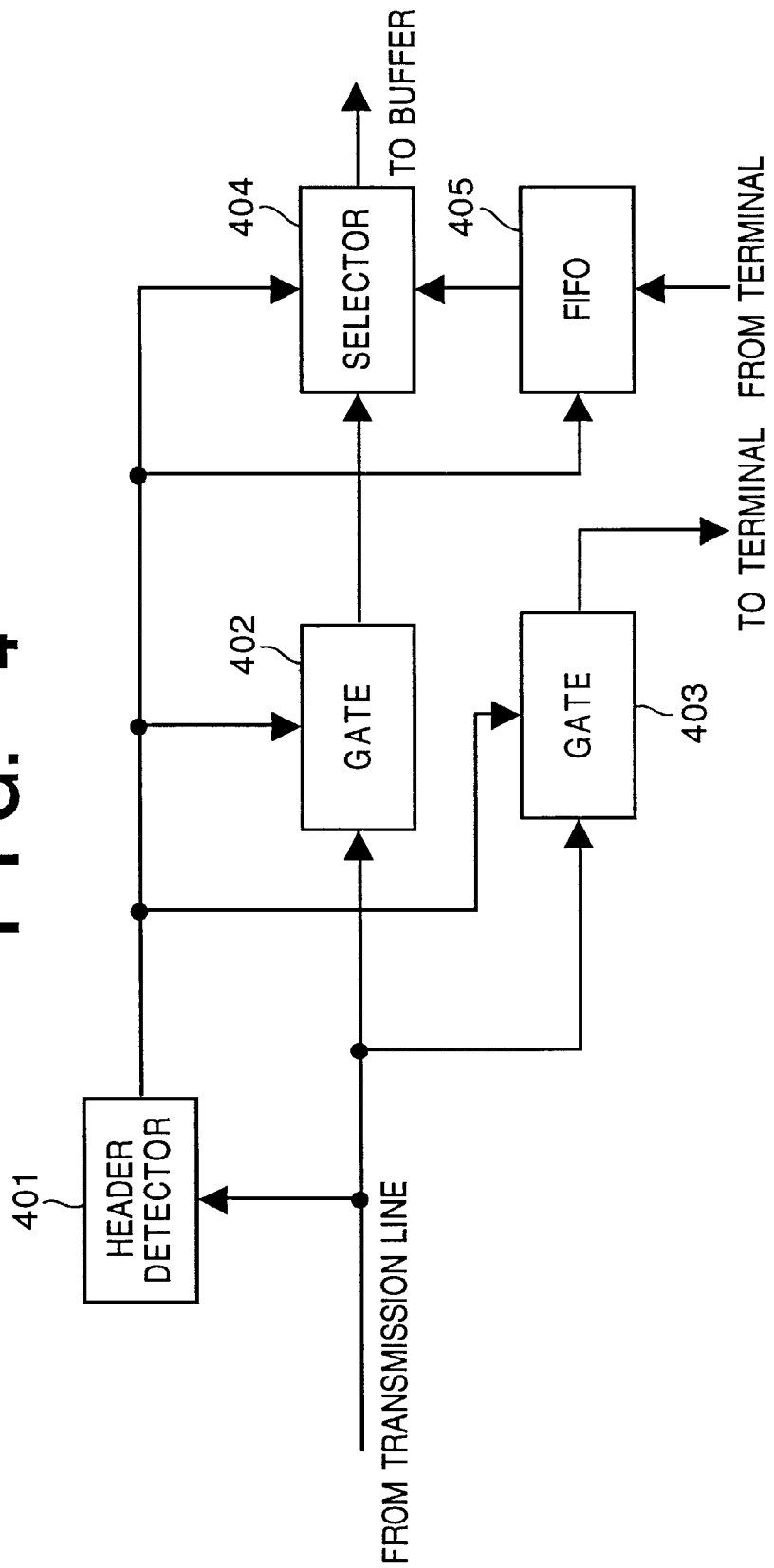

B : BROADCAST
N : NODE NUMBER
T : TRANSMISSION CHANNEL NUMBER
MIS'C : SYNCHRONIZING SIGNAL,
         ERROR CORRECTING CODE, ETC.

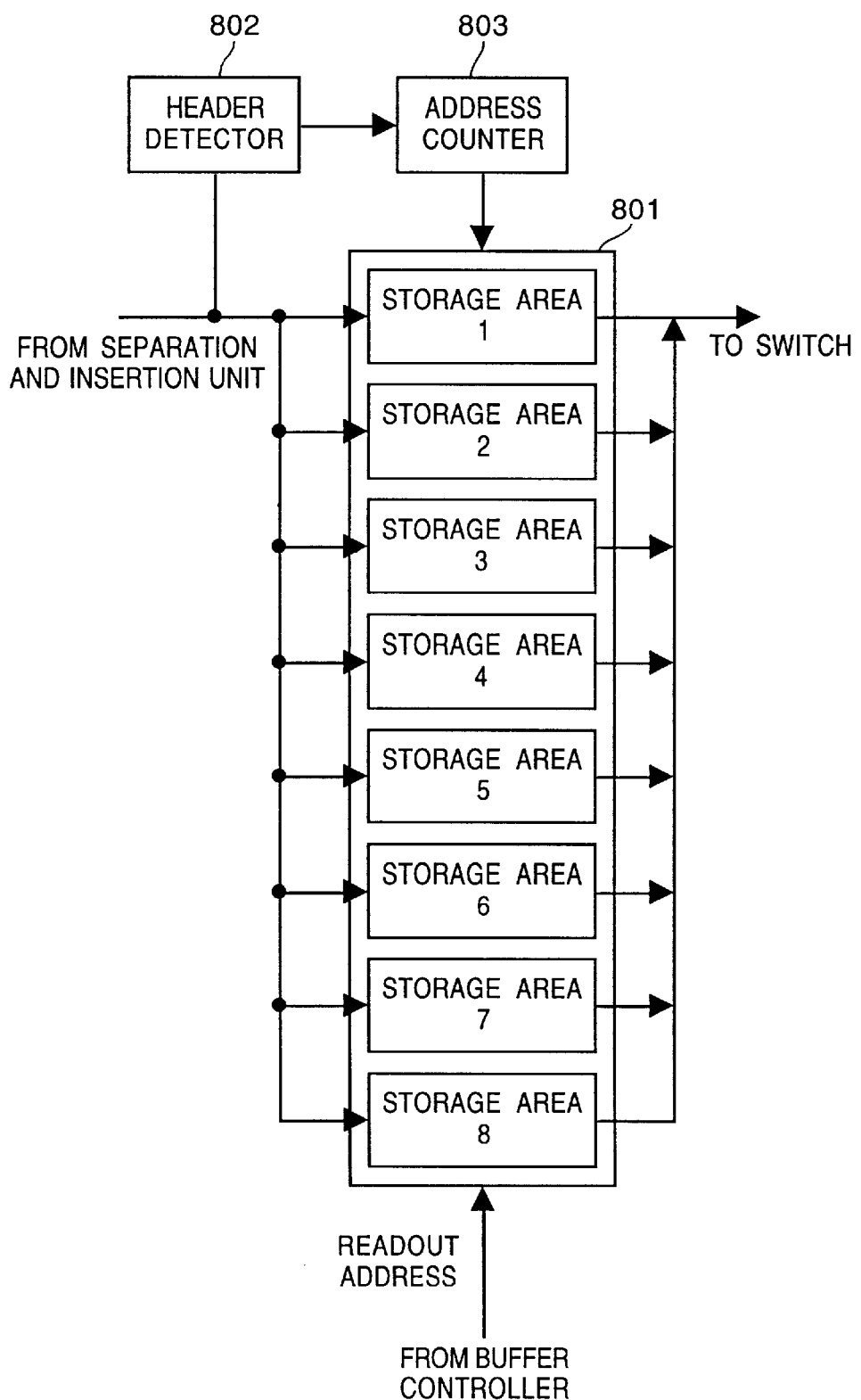

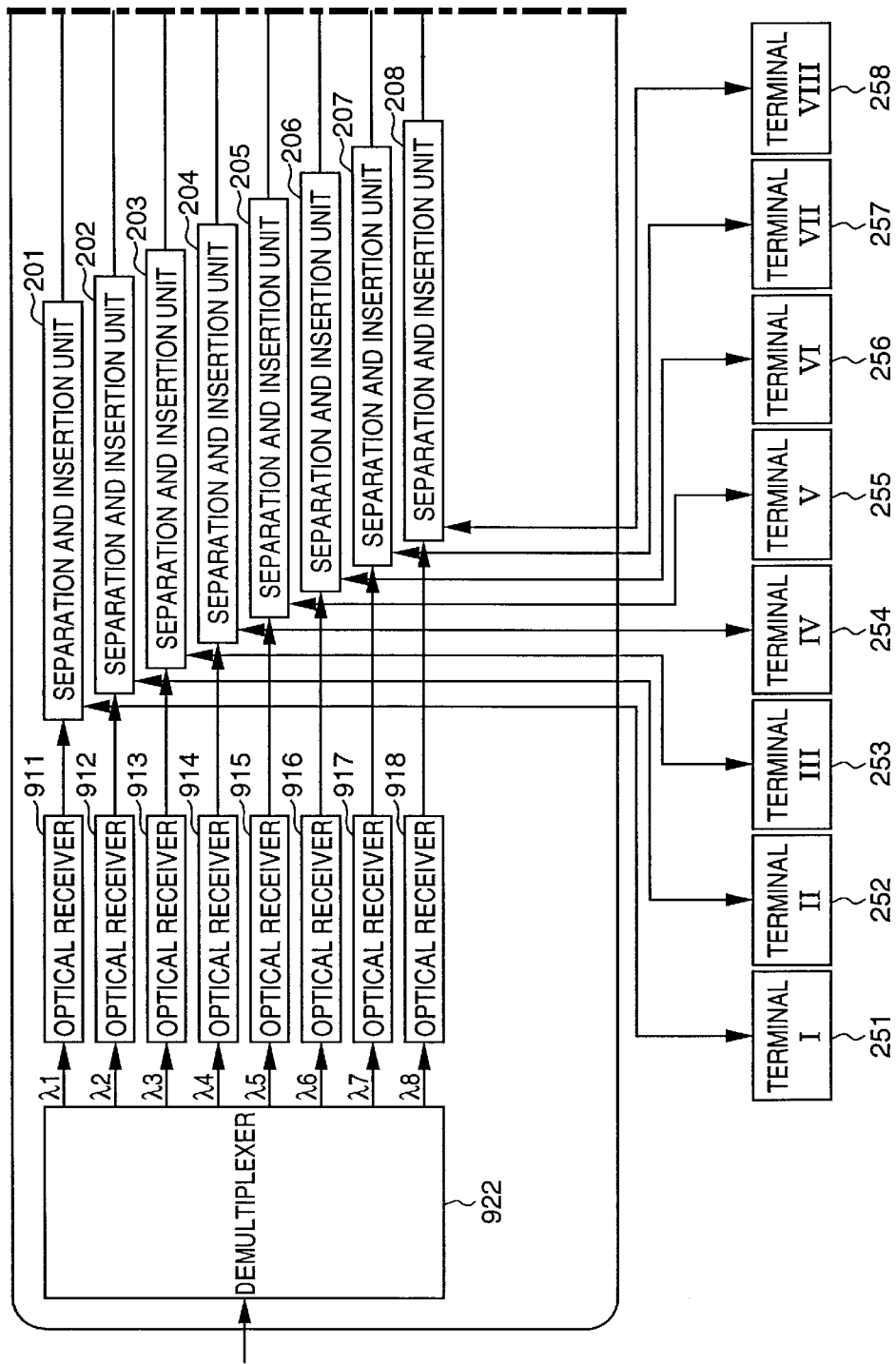

NETWORK SYSTEM AND COMMUNICATION METHOD

BACKGROUND OF THE INVENTION

This invention relates to a communication network in which node devices to each of which a plurality of terminals have been connected are connected by parallel multiplexed transmission lines, as well as to a method of controlling this communication network.

The need to handle greater quantities of information has made it necessary to increase the speed and capacity of networks which connect terminal equipment. To achieve this, network systems in which node devices are connected by parallel multiplexed transmission lines have been studied. Such node devices and a network system which uses them will now be described.

FIG. 1 is a diagram useful in describing the principle of communication of a network system of the kind mentioned above. The network system includes node devices 101~104 having exchange switches 105~108 and buffers 109~112, respectively, terminals 121~136, and parallel transmission lines A, B, C, D which construct a ring. The communication principle of the network system shown in FIG. 1 will now be described.

The plurality of parallel transmission lines A, B, C, D of the network are interconnected by the exchange switches 105~108. Each terminal is connected to one of the parallel transmission lines among the lines A, B, C, D. In a case where one terminal connected to one parallel transmission line communicates with a terminal connected to another parallel transmission line, communication is carried out by switching the first-mentioned terminal to the other parallel transmission line at least one time by any exchange switch. Though the position at which switching is performed is not specified, communication control is facilitated if it is so arranged that the changeover is made to the transmission line of the destination at the node immediately preceding the destination node, with the transfers to arbitrary transmission lines being made at other nodes. In order to simplify the node devices, the exchange switches 105~108 of the network change the input/output connection relationship at a fixed period in accordance with a specific cyclic pattern irrespective of the input signals. After the input signals have been stored temporarily in the buffers 109~112, packets are read out of the buffers when the input/output connection relationship of the exchange switches has attained a desired relationship. This is the manner in which the network performs switching.

For example, in a case where a packet is transmitted from the terminal 122, which is connected to the node device 101, to the terminal 132 connected to the node device 103, the packet output by the terminal 122 is stored in the buffer 109 of the node device 101. When an input terminal IN2 of the switch 105 is connected to, say, an output terminal OUT2, the packet is read out of the buffer and output to the transmission line B. The buffer enters the buffer 110 of the node device 105. When the input terminal IN2 and output terminal OUT4 of the switch 106 are connected, the packet is read out of the buffer 110, whereby the packet is output to the transmission line D and sent to the terminal 132.

Thus, communication is carried out by transferring the packet to any parallel transmission line at each node device.

In a case where a broadcast is made from a certain transmitting terminal to all other terminals in the example of the prior art described above, connections must be established for all terminals. Since this increases the burden upon the transmitting terminal and network, the conventional system is impractical.

SUMMARY OF THE INVENTION

Accordingly, an object of the present invention is to provide a network system and communication method in which the burden upon the transmitting terminal and network is reduced.

According to the present invention, the foregoing object is attained by providing a first network system for connecting a plurality of node devices by a plurality of parallel transmission channels and connecting terminals to respective ones of the plurality of transmission channels via the node devices, each of said node devices comprising:

memory section for temporarily storing transmission data by allotting the transmission data to a plurality of storage areas that correspond to respective ones of the plurality of transmission channels;

transmitting section for transmitting the data, which has been stored in said memory section, upon selecting any of the plurality of transmission channels; and memory control section for controlling said memory section so as to read out the data that has been stored in the storage area that corresponds to the transmission channel that has been selected by said transmitting section;

said memory section having distributing section for distributing broadcast data, which is data, contained in the data that enters said memory section, that is to be transmitted over the plurality of transmission channels, to the plurality of storage areas that correspond to the plurality of transmission channels that are to transmit the data, thereby duplicating the broadcast data.

According to the present invention, the foregoing object is attained by providing a second network system for connecting a plurality of node devices by a plurality of parallel transmission channels and connecting terminals to respective ones of the plurality of transmission channels via the node devices, each of said node devices comprising:

memory section for temporarily storing transmission data, said memory section storing broadcast data, which is data, contained in the data that enters said memory section, that is to be transmitted over the plurality of transmission channels, upon distinguishing this broadcast data from data other than broadcast data;

transmitting section for transmitting the data, which has been stored in said memory section, upon selecting any of the plurality of transmission channels; and memory control section for controlling said memory section so as to duplicate the broadcast data by reading out the broadcast data repeatedly whenever said transmitting section selects any of the plurality of transmission channels, and transmit the broadcast data by the plurality of transmission channels.

The characterizing features of the first and second network systems are the fact that the broadcast data is duplicated in a node device and the fact that control is performed in such a manner that the broadcast data is transmitted over all of the plurality of channels involved in transmission. As a result, the broadcast data can be transmitted in such a manner that the data can be received by a plurality of destinations without establishing a connection for each and every destination.

In order to connect the transmission channels and terminals, the connection is made via separating section in the node devices. The separating section preferably has a function for distributing data, which enters from a transmission channel, to the downstream side of the transmission channel and to the side on which the terminal is connected. In particular, if the separating section has selecting section for selecting, in dependence upon information described in the input data, whether the input data is to be output to the side on which the terminal is connected without being output to the downstream side of the transmission channel, or whether the input data is to be output to the downstream side of the transmission channel without being output to the side on which the terminal is connected, or whether the input data is to be distributed to the downstream side of the transmission channel and the side on which the terminal is connected, then, when it is indicated that the input data is broadcast data and, moreover, data that has already been duplicated by another node device, the data is distributed to the downstream side of the transmission channel and to the side on which the terminal is connected, whereby broadcasting can be realized without requiring that broadcast data that has been duplicated at any node be duplicated for a plurality of channels at other node devices. Furthermore, the entered data can be output to the downstream side of the transmission channel when the entered data is not broadcast data and the data is not destined for a terminal connected to the separating means, and the entered data can be output to the terminal side when the data is destined for a terminal connected to the separating section.

When there are a plurality of the memory sections corresponding to each of the transmission channels that enter the node device, readout and writing can be performed at high speed. In order to change the transmission channel which connects the output from each memory section at this time, it is possible to adopt an arrangement in which the transmitting section has a switch for connecting the plurality of memory sections to mutually different transmission channels and for changing over the transmission channel to which each of the memory sections is connected, or an arrangement in which the transmitting section has a plurality of variable channel transmission sections capable of outputting the data, which has been stored in each memory section, by any of the plurality of transmission channels, and control section for controlling the plurality of variable channel transmitting sections in such a manner that the transmission channels which outputs data to the plurality of variable channel transmitting sections is different from one another.

It would be ideal for the plurality of transmission channels to be multiplexed by wavelength-division multiplexing or space-division multiplexing. If the plurality of node devices are connected in the form of a ring by the plurality of transmission channels, broadcast data duplicated by a node in an amount equivalent to the number of channels and output by this node returns to this node via all other nodes. As a result, broadcast data can be transmitted to all connected terminals.

According to the present invention, the foregoing object is attained by providing a communication method in a network system for connecting a plurality of node devices by a plurality of parallel transmission channels and connecting terminals to respective ones of the plurality of transmission channels via the node devices, comprising the steps of:

in a first node device, which is any one of said plurality of node devices, duplicating first data, which is data to be transmitted to a plurality of terminals, and outputting the duplicated first data over the plurality of transmission channels; and in other node devices, outputting the first data, which enters over all of the transmission channels, to terminals connected to each of the transmission channels via these node devices per se, and outputting the first data over all of the transmission channels.

When broadcasting is performed by this method, broadcasting can be carried out without establishing connections for all destinations.

The plurality of node devices in this method are connected in the form of a ring by the plurality of transmission channels, and it would be ideal to arrange it so that the first data, which enters the first node device via the other node devices upon being duplicated by the first node device and output over all of the transmission channels, is terminated at the first node device.

Further, in order to facilitate the broadcast processing at each node device, an arrangement can be adopted in which the other node devices duplicate the first data entered by each transmission channel, output one by a transmission channel the same as the transmission channel over which the first data was transmitted, and output another one to a terminal connected to this transmission channel via its own node device.

Further, to duplicate the broadcast data, an arrangement can be adopted in which the first node device temporarily stores the duplicated first data, which corresponds to each one of all transmission channels, upon allotting the first data for every transmission channel, or an arrangement can be adopted in which the first node device temporarily stores the first data in advance, duplicates the first data by repeatedly reading out the temporarily stored first data and outputs the first data by all transmission channels.

Further, the first node device is a node device to which a terminal that transmits the first data is connected, a node device designated by a terminal that transmits the first data, or a predetermined node device among the plurality of node devices.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a diagram illustrating a control pattern which controls the switches of the node device;

FIG. 4 is a diagram illustrating the internal construction of a separation and insertion unit of the node device;

FIG. 8 is a diagram showing the internal construction of a buffer in this embodiment;

FIG. 9A and FIG. 9B are diagrams showing the construction of a node device in a second embodiment.

DESCRIPTION OF THE PREFERRED EMBODIMENTS

Figure 1:
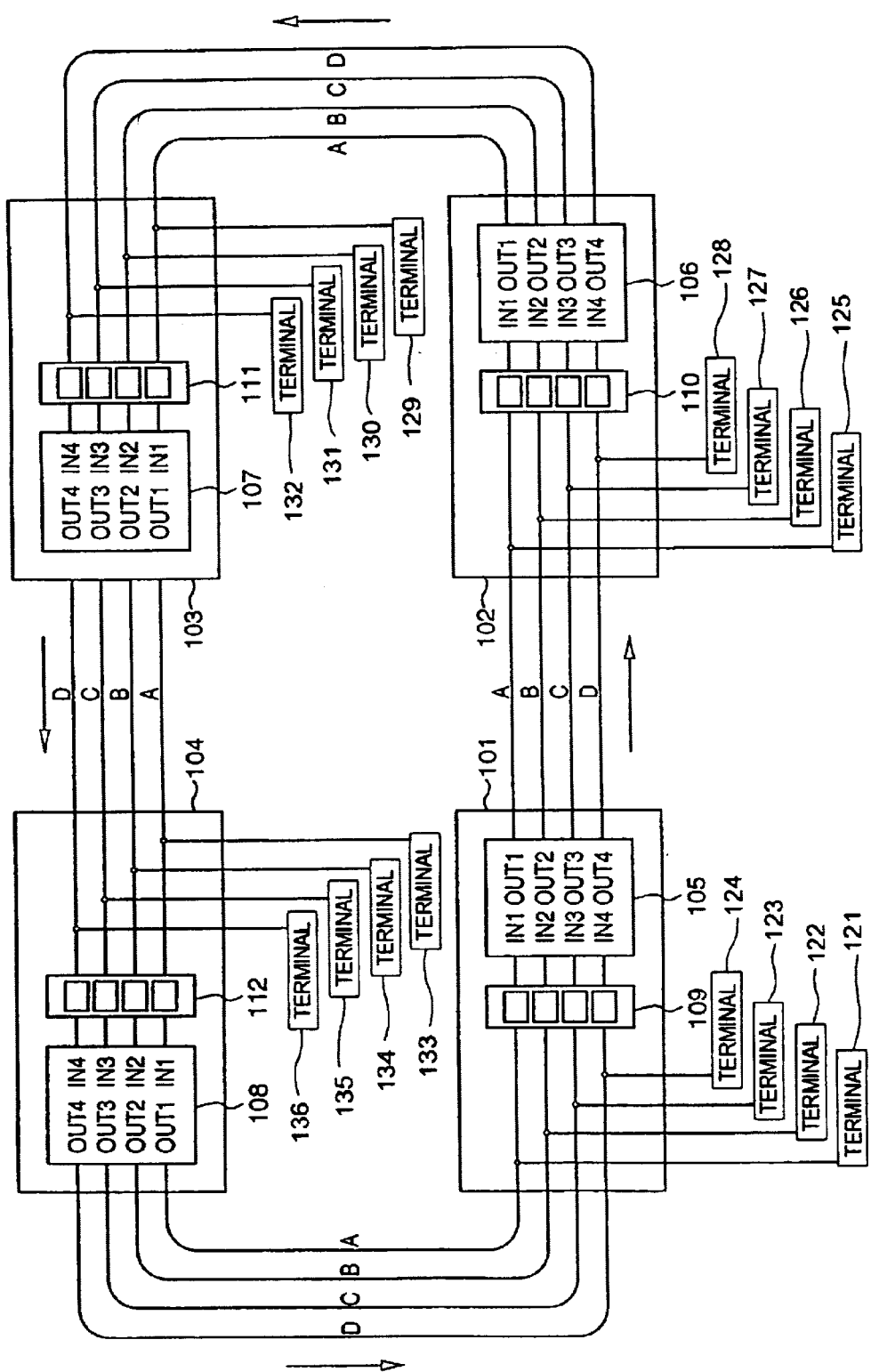
FIG. 1 is a diagram useful in describing the communication principle of a network system.

An example of the construction of a network system to which the present invention is applied will be illustrated first. The basic communication principle used here is the same as the principle described earlier in conjunction with FIG. 1.

Figure 2:
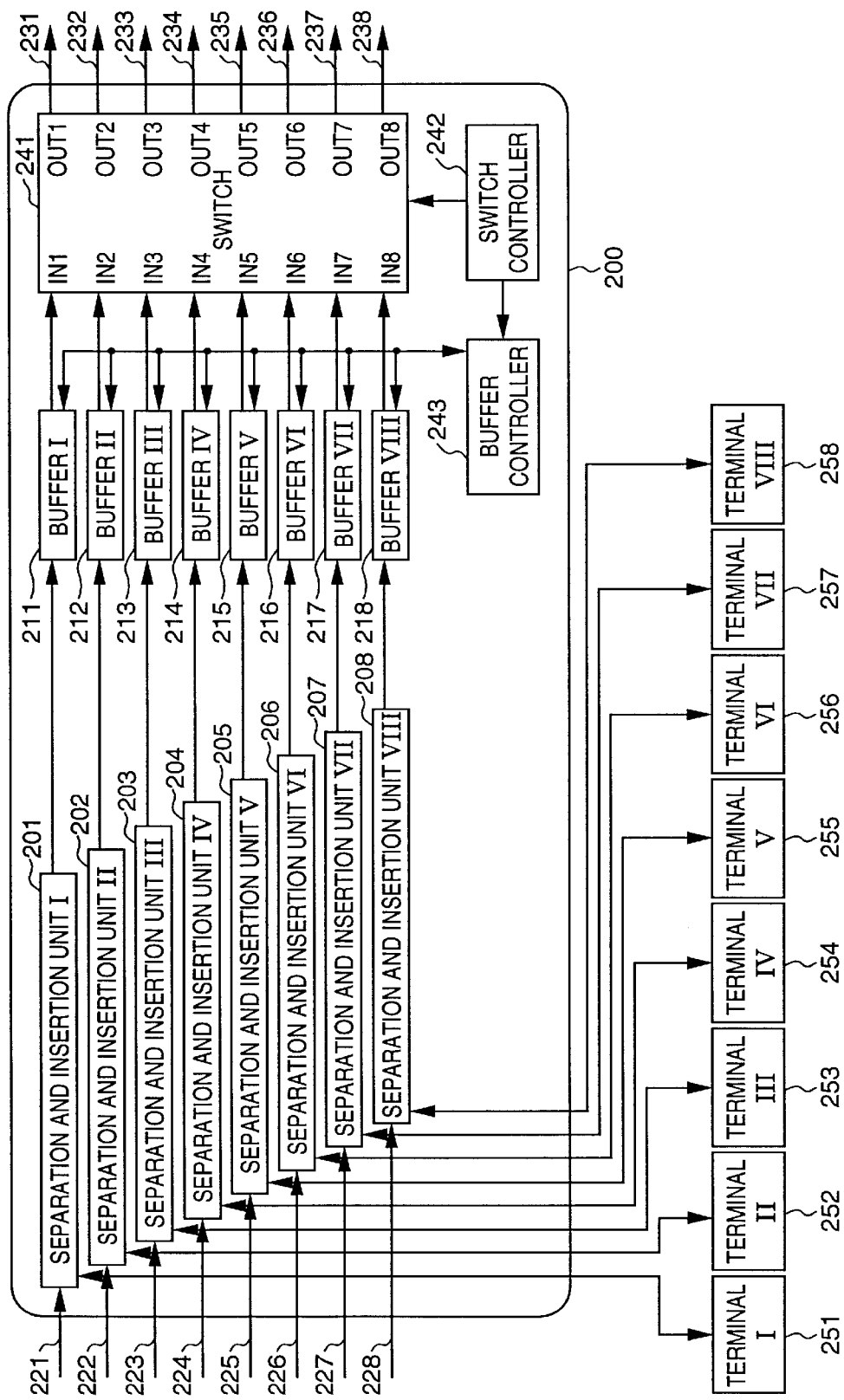
FIG. 2 is a block diagram illustrating the construction of a node device in the network.

FIG. 2 is a block diagram illustrating the construction of a node device in the network. FIG. 2 shows a case in which terminals 251~258 are connected to a node device 200 via subordinate transmission lines. Numerals 201~208 denote separation and insertion units serving as separation and insertion means. These units function to detect the address of a packet that has entered from a parallel multiplexed transmission line and separate packets into packets transmitted to a terminal via a subordinate transmission line and packets entered into a buffer, and function to insert a packet, which has been transmitted from a terminal, into a packet stream that has entered from the parallel multiplexed transmission line. Numerals 211~218 denote buffers serving as buffer means. The buffers function to temporarily store packets, which have been output by the separation and insertion units 201~208, in storage areas that correspond to the output terminals of a switch, which is described later. Numerals 221~228 and 231~238 denote parallel multiplexed transmission lines for connecting nodes. These are a plurality of spatially separated optical fiber transmission lines or wavelength-multiplexed transmission lines obtained by wavelength-division multiplexing on a single optical fiber.

A switch 241 is controlled by a switch controller 242 and connects packets, which have entered at input terminals IN1~IN8, to any output terminal OUT1~OUT8. The switch 241 performs switching using a spatial switch or the like when a plurality of optical transmission lines are used as the parallel multiplexed transmission lines. In a case where the wavelength-multiplexed transmission lines are used, the arrangement is slightly different from that shown in FIG. 2. Specifically, a transmitting unit comprising a plurality of variable wavelength laser diodes and a multiplexer is connected to the wavelength-multiplexed transmission lines and each wavelength is separated in a receiver of the wavelength-multiplexed transmission lines by a demultiplexer, thereby constructing a switch between nodes. Switching is performed by setting the transmission wavelengths of the variable wavelength laser diodes to any wavelength of wavelengths $\lambda 1 \sim \lambda 8$. The switch controller 242 controls the switch in accordance with the control pattern shown in FIG. 3, by way of example. A buffer controller is shown at 243. When the input terminals of the switch connected to the buffers have been connected to desired output terminals, the buffer controller 243 performs control in such a manner that the packets that have been stored in the buffers are read out.

FIG. 3 is a diagram illustrating a control pattern which controls the input/output connection relationship of the switch 241. The input/output connection relationship of the switch 241 is changed by control addresses A1~A8, as shown in FIG. 3. Further, the input terminals IN1~IN8 correspond to buffers 211~218, and the output terminals OUT1~OUT8 (or transmission wavelengths $\lambda 1 \sim \lambda 8$) correspond to storage areas 1~8 of each buffer. The storage areas 1~8 will be described later.

FIG. 4 is a diagram illustrating the internal construction of each of the separation and insertion units 201~208. Each unit includes a header detector 401 for detecting a destination address from the header of a packet, gates 402, 403 for outputting or blocking input signals, a selector 404 for outputting either of two input signals, and a FIFO (first in, first out) unit 405 for temporarily storing a packet.

A packet that has entered from a parallel multiplexed transmission line in the above-described arrangement has its header detected by the header detector 401. Processing for opening or closing the gates 402 and 403 is executed in accordance with the content of the header. Accordingly, stored in the header detector 401 in advance is the address of the terminal connected to its separation and insertion unit. If the detected destination address and the stored address agree, the gate 403 is opened and the gate 402 is closed so that the packet is output only in the terminal direction. If the detected destination address and the stored address do not agree, the gate 402 is opened and the gate 403 is closed so that the packet is output only to the selector 404 and sent to the buffer via the selector 404. On the other hand, a packet that has been transmitted from a terminal is temporarily stored in the FIFO 405. When there is a gap in the stream of packets that have entered the selector 404 from the gate 402, the packet is read out of the FIFO 405 and sent to the buffer via the selector 404.

Figure 5:
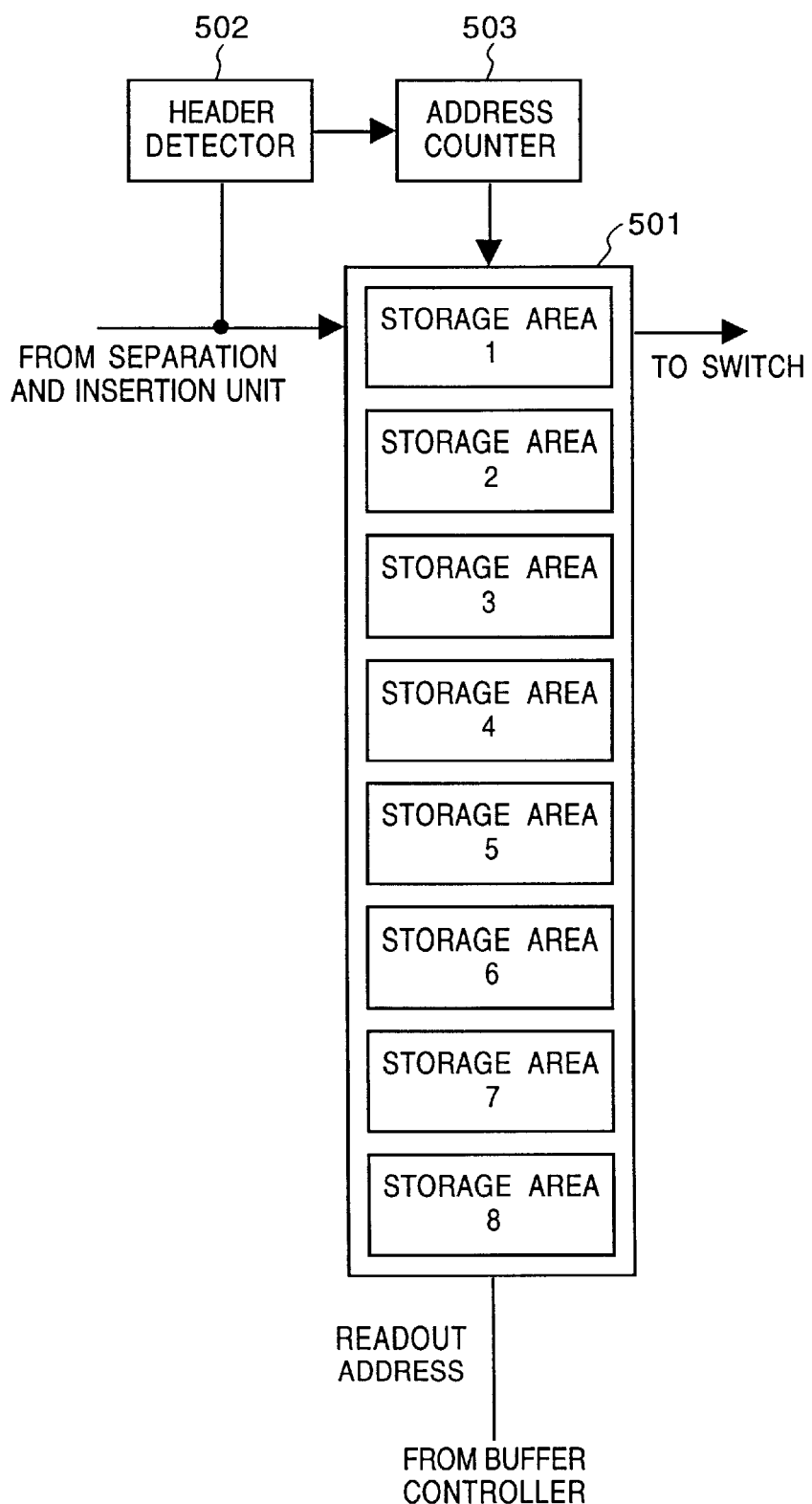
FIG. 5 is a diagram showing the internal construction of a buffer in the node device.

FIG. 5 is a diagram showing the internal construction of each of the buffers 211~218. As shown in FIG. 5, each buffer includes a buffer memory 501 comprising storages areas 1~8 corresponding to the output terminals of the switch 241, a header detector 502 for detecting the destination address from the header of a packet, and an address counter 503 for supplying the buffer memory 501 with a write address.

A packet that has entered from the corresponding separation and insertion unit has its header detected by the header detector 502, and the storage area that is to store this packet is decided by the content of the header. Accordingly, stored in the header detector 502 in advance is the address of the terminal connected to the neighboring node device on the downstream side. If the detected destination address agrees with the stored address, then the storage area corresponding to the transmission line to which this terminal has been connected, namely the storage area corresponding to the output terminal of the switch 241, is designated, a write address is generated by the address counter 503 and the packet is stored at this storage location in the buffer memory 501. If the detected destination address does not agree with the stored address, the packet is stored in any storage area.

Figure 6:
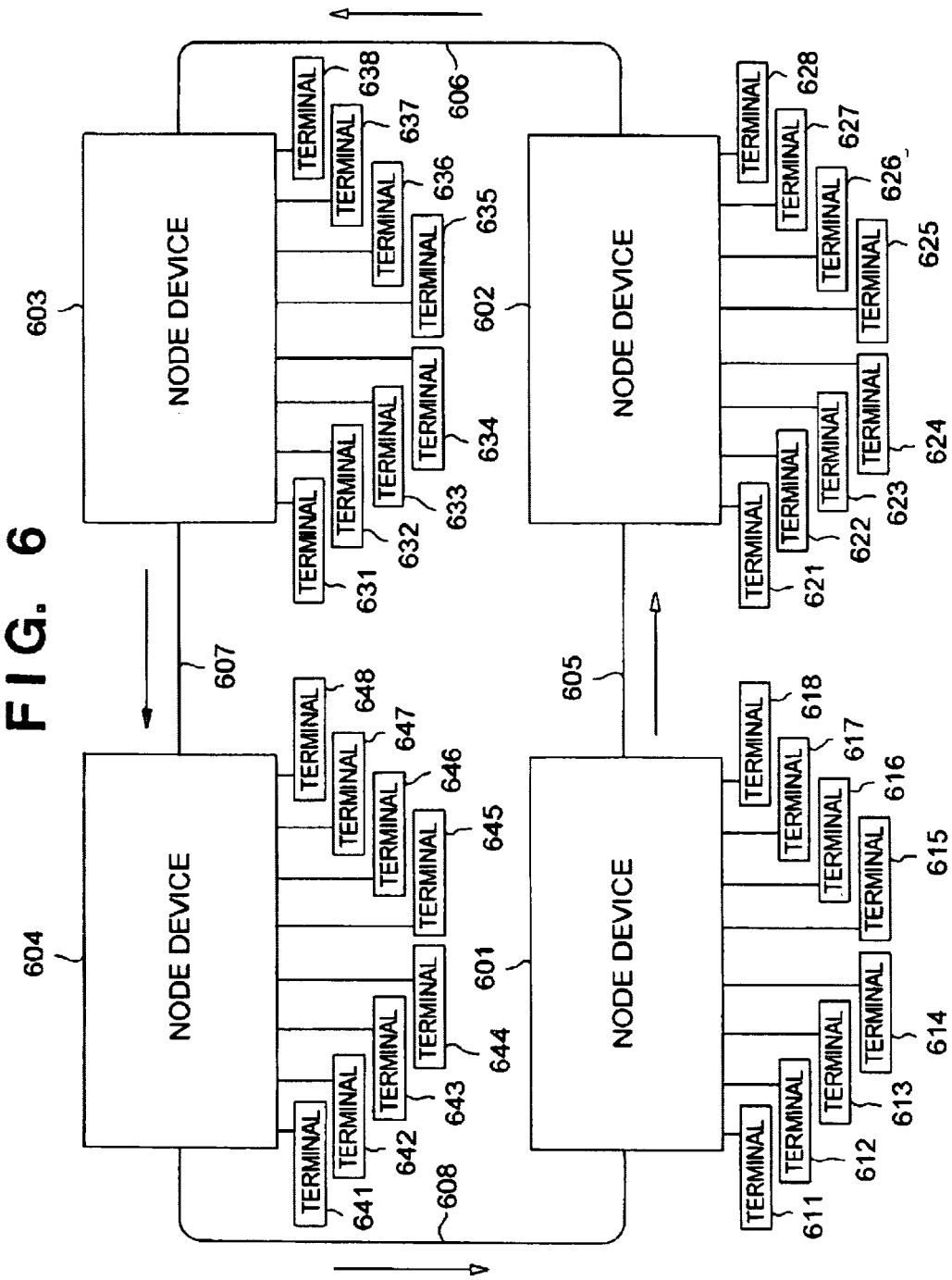
FIG. 6 is a diagram showing the construction of a network system using node devices.

FIG. 6 is a diagram showing the construction of a network system using the node devices described above. As shown in FIG. 6, four node devices 601~604 are connected in the form of a ring by parallel multiplexed transmission lines 605~608. Eight terminals are connected to each node device via respective ones of eight subordinate transmission lines. Terminals 611~618 correspond to the terminals 251~258 shown in FIG. 2. Similarly, terminals 621~628, terminals 631~638 and terminals 641~648 also correspond to the terminals 251~258.

A specific example of the operation of a network system having this configuration will now be described.

In the description that follows, it will be assumed that the parallel multiplexed transmission lines are a plurality of spatially separated optical fiber transmission lines and that the switches are spatial switches. However, the foregoing principles hold even in a case where wavelength-multiplexed transmission lines are used and operation in such case is substantially the same. Further, a case will be described in which data is transmitted from the terminal 612 connected to the node device 601 to the terminal 635 connected to the node device 603.

First, the transmission data from the terminal 612 is divided into a plurality of packets of fixed length, a destination address is described in the header of each packet and then each packet is output. The output packet enters the node device 601 through the subordinate transmission line and is stored temporarily in the FIFO 405 of the separation and insertion unit 202. The stored packet is read out of the FIFO 405 when there is a gap in the stream of packets that have entered the selector 404 from the gate 402. The packet that has been read out is sent to the buffer 212 via the selector 404. The header of the entered packet is detected by the header detector 502 of the buffer 212. Since the detected destination address does not agree with the stored address, any storage area is designated. As a result, the address counter 503 generates a write address and the packet is written to any storage area of the buffer memory 501. Here it will be assumed that the packet is stored in storage area 1.

Next, the buffer controller 243 places the readout of this packet on standby until the input terminal IN2 of the switch 241 is connected to the output terminal OUT1. When the connection has been made, the buffer controller 243 reads the packet out of the buffer memory. The switch controller 242 performs control in such a manner that control addresses are supplied successively in the manner A1, A2, A3, A4, A5, A6, A7, A8, as indicated by the control table of FIG. 3, thereby changing the connection relationship of the switch 241 and supplying control addresses at a period of, say, one packet length. As a result, the same pattern is repeated at a period of eight packets. This information is sent to the buffer controller 243 to control the timing of readout from each buffer. When the input terminal IN2 of the switch 241 has been connected to output terminal OUT1, the packet is read out of the storage area OUT1 of the buffer 212 and is output to the transmission line 231 via the switch 241.

The packet that has been transmitted to the transmission line 231 enters the separation and insertion unit 201 of the node device 602, where the header of the packet is detected by the header detector 401. Since the detected destination address does not agree with the stored address, the gate 402 is opened and the gate 403 is closed to output the packet to the selector 404. The packet that has been output from the separation and insertion unit 201 to the selector 404 enters the buffer 211 through the selector 404. The header of the packet is detected by the header detector 502 shown in FIG. 5. Since the detected destination address coincides with the stored address, the storage location corresponding to the transmission line to which the terminal of the destination address has been connected is designated. Since the destination terminal has been connected to the transmission line 235, the packet is stored in storage location 5.

When the input terminal IN1 of the switch 241 is subsequently connected to the output terminal OUT5, the buffer controller 243 reads the packet out of the storage area OUT5 of the buffer 211, as a result of which the packet is output to the transmission line 235 via the switch 241. The packet that has entered the separation and insertion unit 205 of the node device 603 via the transmission line has its header detected by the header detector 401. Since the detected destination address agrees with the stored address, the gate 403 is opened and the gate 402 is closed so that this packet is output only in the terminal direction. The packet that been output in the direction of the terminal from the separation and insertion unit 205 is sent to the terminal 635 via the subordinate transmission line. This packet is received by the terminal 635.

Thus, communication from a terminal connected to a node device to a terminal connected to another node device is performed via the network.

An example in which the present invention is applied to the foregoing arrangement to facilitate broadcasting will now be described.

A characterizing feature of the present invention resides in the fact that a packet to be broadcast is duplicated (distributed) by a node device.

In the embodiment illustrated below, the above-mentioned characterizing feature manifests itself in the construction and control of the buffers in the node device and in the construction and control of the separation and insertion units of the node device. Further, in order to distinguish between broadcast and other communication in the following embodiment, packets are constructed in such a manner that a packet to be broadcast can be distinguished from a packet that is not to be broadcast.

First Embodiment

Figure 7:
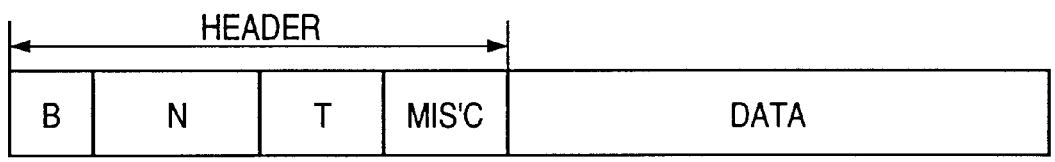
FIG. 7 is a diagram showing the composition of a packet in this embodiment.

FIG. 7 is a diagram showing the composition of a packet used in the network of this embodiment. In FIG. 7, the letter B represents a broadcast bit which is "1" at the time of broadcast and "0" at all other times. Further, the letter N represents the node number. If we assume that 100 node devices are capable of being connected, then the node number N will be represented by seven bits indicating node numbers of 1 to 100. Next, the letter T represents the transmission channel number. If the number of transmission channels (the multiplex number) of the parallel multiplexed transmission lines is assumed to be eight, then the transmission channel number T will be represented by three bits indicating numbers of 1 to 8. "Mis'c" is a synchronizing signal or error correcting code, etc., that is inserted as necessary. Since each terminal in the network according to this embodiment is individually identified by the node device to which the terminal is connected and the transmission channel, namely by the node number and transmission channel number, a node number of transmission channel number of a terminal will be referred to collectively as a "terminal number".

The construction and operation of the separation and insertion unit according to this embodiment will now be described.

The internal construction of the separation and insertion unit according to this embodiment is as illustrated in FIG. 4 but the method of control is different. A pallet that has entered from a transmission line has its header (bits B, N and T) detected by the header detector 401, and processing for opening and closing the gates 402, 403 is executed based upon the content of the header. The terminal number of the terminal connected to this separation and insertion unit is stored in the corresponding header detector 401 in advance. If the detected terminal number and the stored terminal number agree, the gate 403 is opened and the gate 402 is closed so that the packet is output only in the direction of the terminal. If the detected terminal number and the stored terminal number do not agree, the gate 402 is opened and the gate 403 is closed when the B bit is "0", whereby the packet is output solely to the selector 404. If the detected terminal number and the stored terminal number do not agree, the gates 402 and 403 are both opened when the B bit is "1", whereby the packet is output to the terminal and to the selector 404.

FIG. 8 is a diagram showing the internal construction of each of the buffers 211~218 in this embodiment. As shown in FIG. 8, each buffer includes a buffer memory 801 comprising storage areas 1~8 corresponding to the output terminals of the switch 241, a header detector 802 for detecting each of the bits B, N, T from the header of the packet, and an address counter 803 for supplying the buffer memory 801 with a write address. This buffer differs from that shown in FIG. 5 in that each storage area has its own independent input terminal so that a plurality of storage areas of the buffer memory 801 can be written simultaneously.

A packet that has entered from the separation and insertion unit in this arrangement has its header detected by the header detector 802, and the storage area that is to store this packet is decided by the content of the header. Stored in the header detector 802 in advance are the node number of its own node, the neighboring node number of the neighboring downstream node, and the transmission channel number of the parallel multiplexed transmission line to which each buffer is connected via the separation and insertion unit. In a case where the B bit is "0" and the detected node number agrees with the stored neighboring node number, the storage area having the same number as the detected transmission channel number is designated, a write address is generated by the address counter 803 and the packet is stored in the buffer memory 801. In a case where the B bit is "0" and the detected node number does not agree with the stored neighboring node number, control is performed in such a manner that the packet is stored in any storage area. In a case where the B bit is "1" and the detected node number agrees with the node number of its own node device, control is performed in such a manner that the node is stored in all of the storage areas 1~8 simultaneously. In a case where the B bit is "1" and the detected node number agrees with the stored node number of its own node device, control is performed in such a manner that the packet is stored in a storage area having the same number as the stored transmission channel number.

The construction of the node device according to this embodiment is the same as that of the node device shown in FIG. 2 except for the internal construction of the buffers. The operation of one-to-one communication in the network of FIG. 6 using this node device will be described first. It will be assumed that the terminal 612 transmits a signal to the terminal 635.

First, at terminal 612, the terminal number (e.g. N=3, T=5) of the receiving terminal 635 is described in the header of a packet and "0" is described in the B bit, and the packet is transmitted. This packet enters the separation and insertion unit 202 of the node device 601 via the subordinate transmission line. Meanwhile, the selector 404 of the separation and insertion unit 202 inserts the packet from the terminal 612 into a gap in the packet stream from the transmission line and the packet stream is sent to the buffer 212. The header of the entered packet is detected by the header detector 802 of the buffer 212. Since the B bit is "0" and the detected node number does not agree with the stored neighboring node number, any storage area is designated. Here the storage area 1 is designated, by way of example. As a result, the address counter 803 generates a write address and the packet is stored in storage area 1 of the buffer memory 801. The switch controller 242 makes the input/output connection relationship of the switch 241 conform to FIG. 3 and performs control in such a manner that the control addresses A1~A8 are produced cyclically. The control addresses are communicated to the buffer controller 243. If the buffer controller 243 performs control in such a manner that the packet is read out of the storage area 1 of buffer 212 when the control address is A8, the packet is output from the input terminal IN2 of buffer 241 to the transmission line 231 via the output terminal OUT1.

Next, the packet transmitted through the transmission line enters the separation and insertion unit 301 of the node device 602, where the header of the packet is detected by the header detector 401. Since the detected terminal number and the stored terminal number do not coincide and the B bit is "0", the gate 402 is opened and the gate 403 is closed to output the packet to the selector 404. The packet that has been output from the separation and insertion unit 201 to the selector 404 enters the buffer 211 via the selector 404. When the header is detected by the header detector 802 of the buffer 211, a storage location whose number is the same as the detected transmission channel number is designated because the B bit is "0". The packet that has been stored in the storage area 5 of the buffer 211 is now read out when the control address is A5 and the packet is output from the input terminal IN1 of the buffer 241 to the transmission line 235 via the output terminal OUT5.

Thereafter, the packet that has entered the separation and insertion unit 205 of the node device 603 via the transmission line has its header detected by the header detector 401. Since the detected terminal number and the stored terminal number agree, the gate 403 is opened and the gate 402 is closed so that the packet is output solely in the direction of the terminal. The packet that has been output to the terminal from the separation and insertion unit 205 is sent to and received by the terminal 635 via the subordinate transmission line 635.

A method of performing a broadcast by the communication network of this embodiment will now be described. Here a case will be described in which it is assumed that data is sent to all terminals from terminal 612. First, at terminal 612, the terminal number (e.g. N=1, T=2) of the transmitting terminal is described in the header of a packet and "1" is described in the B bit, and the packet is transmitted. This packet enters the separation and insertion unit 202 of the node device 601 via the subordinate transmission line. The selector 404 of the separation and insertion unit 202 inserts the packet from the terminal into a gap in the packet stream from the transmission line and the packet stream is sent to the buffer 212. Next, when the header of the entered packet is detected by the header detector 802 of the buffer 212, all of the storage areas 1~8 are designated because the B bit is "1" and the detected node number agrees with the stored node number of the same node device. As a result, the address counter 803 generates a write address and this packet is written in all storage locations 1~8 of the buffer memory 801 simultaneously. The switch controller 242 makes the input/output connection relationship of the switch 241 conform to FIG. 3 and notifies the buffer controller 243 of the control address.

Upon being supplied with address A8, the buffer controller 243 performs control in such a manner that the stored packet is read out of the storage area 1 of the buffer 212. Upon being supplied with address A1, the buffer controller 243 performs control in such a manner that the stored packet is read out of the storage area 2 of the buffer 212. Similarly, when addresses A2~A7 have been supplied, the buffer controller 243 performs control so as to read the stored packets out of the storage areas 3~8 of the buffer 212. Since the packets for broadcast have been stored in each of the storage areas, at this time the broadcast packets are read out of the buffer 212 successively, the successively read broadcast packets enter from the input terminal IN2 of the switch 241 and are output to all of the output terminals OUT1~OUT8, whereby the packets are transmitted successively to the transmission lines 231~238.

The eight packets output by the node device 601 enter the separation and insertion units 201~208 of the node device 601 and have their headers detected by the respective header detectors 401. Since the detected terminal number and the stored terminal do not agree and the B bit is "1", the gates 402 and 403 are both opened so that the packet is output to the selector 404. The packets output toward the terminals from the separation and insertion units 201~208 are sent to the terminals 621~628 through each of the subordinate transmission lines. Meanwhile, packets output to the selectors 404 enter the buffers 211~218 via the selectors 404. When the headers are detected by the header detectors 802 of the respective buffers 211~218, the packets are stored in storage areas whose numbers are the same as the stored transmission channel numbers because the B bit is "1" and the detected node numbers agree with the stored node numbers of the node devices per se. In other words, the packets are stored in storage area 1 in buffer 211, in storage area 2 in buffer 202 and, in similar fashion, in storage areas 3~8 of buffers 213~218.

Thereafter, the packets for broadcast that have been stored in the buffers are read out simultaneously when the control address is the address A1 for which the channel prevailing when there is an input to the above-mentioned node device coincides with the output channel. The broadcast packet that has entered from the transmission line 221 is output to the transmission line 231, the broadcast packet that has entered from the transmission line 222 is output to the transmission line 232, and, in similar fashion, the broadcast packets that have entered from the transmission lines 223~228 are output to the transmission lines 233~238. Similarly, packets are distributed to the terminals 631~638 and 641~648 in the node devices 603, 604, and the packets are relayed and enter the node device 601. When the headers of the packets are detected by the separation and insertion units of the node device 601, the detected terminal numbers and the stored terminal numbers agree. As a result, the gate 403 is opened and the gate 402 is closed so that the packets are output solely in the direction of the terminals. Accordingly, the packets that have been output in the directions of the terminals from the separation and insertion units 201~208 are sent to the terminals 611~618 via the subordinate transmission lines and the packets are transmitted to all terminals of the network.

Thus, in a situation where broadcast communication is carried out, eight copies of the broadcast packets are made in the node device to which the transmission terminal is connected and the packet copies are sent to eight rings. The packets are transmitted so as to be distributed and relayed and transferred to another ring at each node device, with the packets being terminated at the transmitting node device.

Second Embodiment

A second embodiment of the invention will now be described.

Figure 9B:
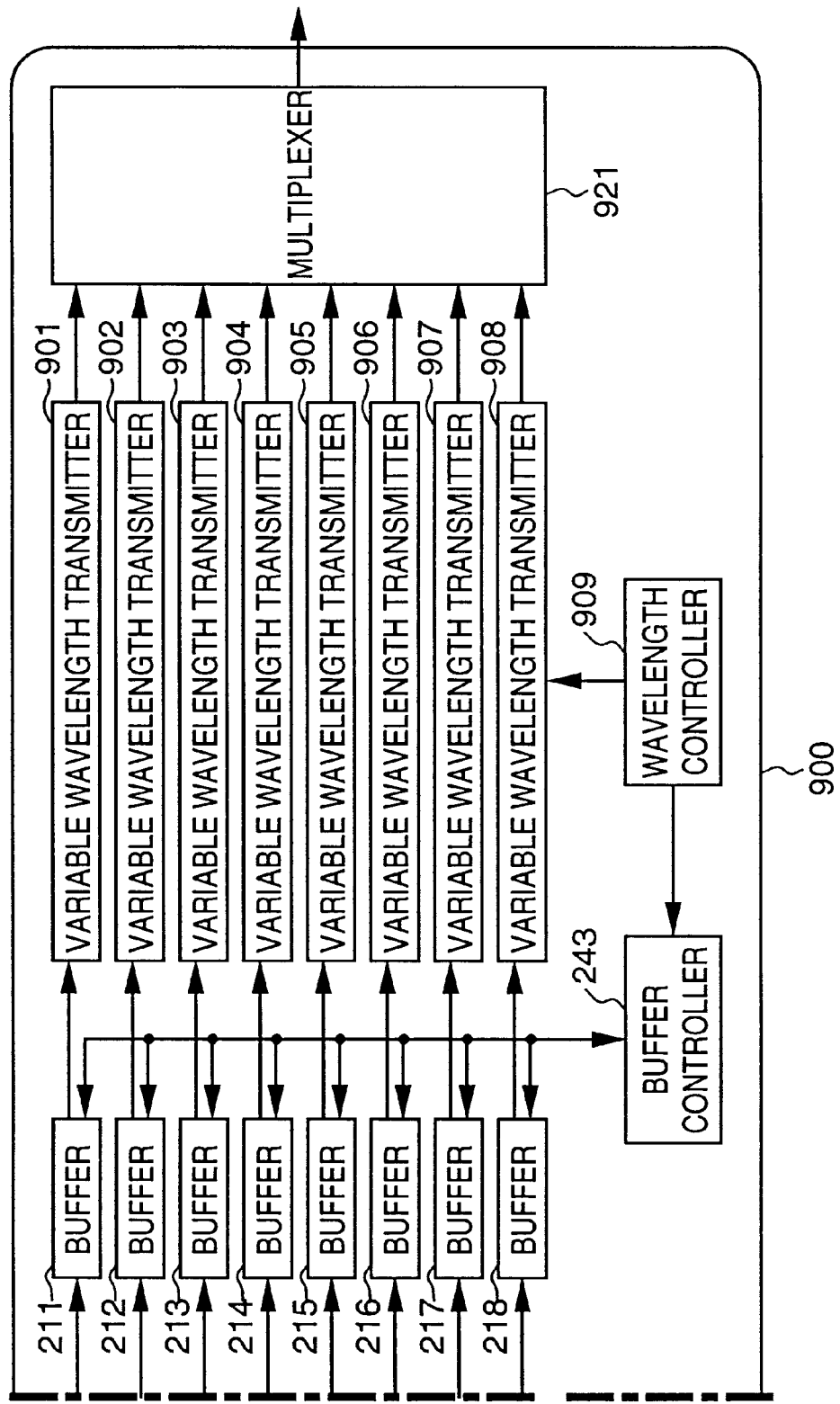

FIGS. 9A and 9B are diagrams showing the construction of a node device according to a second embodiment of the present invention. In the first embodiment, separate transmission lines are used as a plurality of channels connecting the node devices. In the second embodiment, however, a plurality of wavelengths that differ from one another are used as the plurality of channels. More specifically, in the first embodiment, a space-division switch is used as the switch 241 and space-division parallel multiplexed transmission lines such as ribbon fibers are used as the transmission lines. By contrast, in this embodiment, wavelength multiplexing is used and signals are multiplexed on a single optical fiber. Further, according to this embodiment, an example in which switching is performed between two opposing node devices is illustrated.

Variable wavelength transmitters 901~908 shown in FIG. 9B are optical transmitters which, by controlling the injection current of laser diodes, convert the input signals to optical signals of any wavelength and output the optical signals. A wavelength controller 909 controls the variable wavelength transmitters 901~908 in accordance with the wavelength pattern shown in FIG. 3 in such a manner that the respective transmission wavelengths are set to any wavelength. For example, by changing the control addresses A1~A8 periodically in successive fashion, a signal that has entered the input terminal IN1 of the variable wavelength transmitter 901 is converted to an optical signal of wavelength $\lambda 1$, this signal is converted to an optical signal of wavelength $\lambda 2$ in the next period and, in a similar manner, the change to optical signals of wavelengths $\lambda 3, \lambda 4, \lambda 5, \lambda 6, \lambda 7, \lambda 8$ is made in successive fashion. Similarly, a signal that has entered the input terminal IN2 of the variable wavelength transmitter 902 is repeatedly converted to optical signals of the above-mentioned wavelengths in the order of wavelengths $\lambda 2, \lambda 3, \lambda 4, \lambda 5, \lambda 6, \lambda 7, \lambda 8, \lambda 1$. The other variable wavelength transmitters 903~908 also operate in the same way. The period of the change in wavelength is set to a whole-number multiple of packet length, by way of example. More specifically, the transmission wavelength is changed repeatedly in units of several packets. Though the wavelength control pattern used is not limited to that shown in FIG. 3, the plurality of variable wavelength transmitters use a wavelength control pattern according to which signals are not transmitted at the same wavelength at the same time. A multiplexer 921 collects the optical signals, which have been output by the variable wavelength transmitters, in a single optical fiber and outputs the resulting signal to an external optical fiber transmission line. A demultiplexer 922 separates the optical signals of wavelengths $\lambda 1 \sim \lambda 8$ sent from the external optical fiber transmission line into the individual wavelengths. Optical receivers 911~918 convert the optical signals of wavelengths $\lambda 1 \sim \lambda 8$, which have been separated by the demultiplexer 922, to electric signals. The other components of the node device are similar to those of the first embodiment and are designated by like reference characters.

The operation of one-to-one communication in the network of FIG. 6 using the node device of this embodiment will be described first. It will be assumed that the terminal 612 transmits a signal to the terminal 635.

First, at terminal 612, the terminal number (e.g. N=3, T=5) of the receiving terminal 635 is described in the header of a packet and "0" is described in the B bit, and the packet is transmitted. This packet enters the separation and insertion unit 202 of the node device 601 via the subordinate transmission line. The selector 404 of the separation and insertion unit 202 inserts the packet from the terminal into a gap in the packet stream from the transmission line and the packet stream is sent to the buffer 212. When the header of the entered packet is detected by the header detector 802 of the buffer 212, any storage area is designated because the B bit is "0" and the detected node number does not agree with the stored neighboring node number. Here the storage area 1 is designated, by way of example. The write address counter 803 receives this information and generates a write address and the packet is stored in storage area 1 of the buffer memory 801. The wavelength controller 909 performs control in accordance with the wavelength control pattern of FIG. 3 in such a manner that the control addresses A1~A8 are cycled periodically. The control addresses are communicated to the buffer controller 243. If the buffer controller 243 performs control in such a manner that the packet is read out of the storage area 1 of buffer 212 when the control address is A8, the packet enters from the input terminal IN2 of the variable wavelength transmitter 902 and is converted to an optical signal of wavelength λ1. This output signal is output to the optical fiber transmission line 605 via the multiplexer 921. The packet transmitted through the transmission line is output from the output terminal of wavelength λ1 by the demultiplexer 922 of node device 602, the packet is converted to an electric signal by the optical receiver 911 and the electric signal is output to the separation and insertion unit 201. Here the header of the packet is detected by the header detector 401. Since the detected terminal number and the stored terminal number do not coincide and the B bit is "0", the gate 402 is opened and the gate 403 is closed to output the packet to the selector 404. The packet that has been output from the separation and insertion unit 201 to the selector 404 enters the buffer 211 via the selector 404. When the header is detected by the header detector 802 of the buffer 211, a storage location whose number is the same as the detected transmission channel number is designated because the B bit is "0" and the detected node number coincides with the stored neighboring node number. Here the transmission channel number is 5, so the packet is stored in storage area 5. The packet that has been stored in the storage area 5 of the buffer 211 is now read out when the control address is A5. Since the transmission wavelength has been set to wavelength λ5, the variable wavelength transmitter 901 converts the packet to an optical signal of wavelength λ5 and outputs the optical signal to the optical fiber transmission line 606. The optical signal that has entered the node device 603 via the transmission line is output from the output terminal of wavelength λ5 of demultiplexer 922 and is converted to an electric signal by the optical receiver 915. The received packet has its header detected by the header detector 401 of the separation and insertion unit 205. Since the detected terminal number agrees with the stored terminal number, the gate 403 is opened and the gate 402 is closed so that the packet is output only in the direction of the terminal. The packet that has been output to the terminal from the separation and insertion unit 205 is sent to and received by the terminal 635 via the subordinate transmission line 635. Communication is thus carried out.

A method of performing broadcast communication will be described next. Here a case will be described in which it is assumed that a signal is sent to all terminals from terminal 612. First, at terminal 612, the terminal number (e.g. N=1, T=2) of the transmitting terminal is described in the header of a packet and "1" is described in the B bit, and the packet is transmitted. This packet enters the separation and insertion unit 202 of the node device 601 via the subordinate transmission line. The selector 404 of the separation and insertion unit 202 inserts the packet from the terminal into a gap in the packet stream from the transmission line and the packet stream is sent to the buffer 212. When the header of the entered packet is detected by the header detector 802 of the buffer 212, all of the storage areas 1~8 are designated because the B bit is "1" and the detected node number agrees with its own stored node number. The address counter 803 receives this information and generates a write address. This packet is written in all storage locations 1~8 of the buffer memory 801 simultaneously. The wavelength controller 909 performs control in accordance with the wavelength control pattern of FIG. 3 in such a manner that the transmission wavelengths of the variable wavelength transmitters are cycled periodically. These control addresses are communicated to the buffer controller 243. Upon being supplied with address A8, the buffer controller 243 performs control in such a manner that the stored broadcast packet is read out of the storage area 1 of the buffer 212. Upon being supplied with address A1, the buffer controller 243 performs control in such a manner that the stored broadcast packet is read out of the storage area 2 of the buffer 212. Similarly, when addresses A2~A7 have been supplied, the buffer controller 243 performs control so as to read the stored broadcast packets out of the storage areas 3~8 of the buffer 212. As a result, the broadcast packets successively read out of the buffer 212 enter from the input terminal IN2 of the variable wavelength transmitter 902, the transmission wavelength is changed whenever an address is supplied and the optical signals of wavelengths λ1~λ8 are sent to the optical fiber transmission line 605. The eight packets of different wavelengths output by the node device 601 enter the node device 602 via the optical transmission line and are separated into the individual wavelengths by the demultiplexer 922, whereupon a conversion is made to electric signals by the optical receivers 911~918 provided for respective ones of the wavelengths. The received packets enter the respective separation and insertion unit 201~208, where the headers of the packets are detected by the respective header detectors 401. Since the detected terminal number and the stored terminal do not agree and the B bit is "1", the gates 402 and 403 are both opened so that the packet is output to the selector 404. The packets are output toward the terminals from the separation and insertion units 201~208 are sent to the terminals 621~628 through each of the subordinate transmission lines. Meanwhile, packets output to the selectors 404 enter the buffers 211~218 via the selectors 404. When the headers are detected by the header detectors 802 of the respective buffers 211~218, the packets are stored in storage areas whose numbers are the same as the stored transmission channel numbers because the B bit is "1" and the detected node numbers agree with the stored node numbers of the node devices per se. In other words, the packets are stored in storage area 1 in buffer 211, in storage area 2 in buffer 202 and, in similar fashion, in storage areas 3~8 of buffers 213~218. The packets that have been stored in the respective buffers are read out when the control address is A1, the broadcast packet that has been stored in the storage area 1 of buffer 211 is converted to an optical signal of wavelength λ1 and the optical signal is output to the optical fiber transmission line 606. The broadcast packet that has been stored in the storage area 2 of buffer 212 is converted to an optical signal of wavelength λ2 and the optical signal is output to the optical fiber transmission line 606. Similarly, the broadcast packets that have been stored in the other respective buffers are converted to optical signals of wavelengths λ3, λ4, λ5, λ6, λ7, λ8 and these optical signals are output to the optical transmission line 606. Likewise, signals are distributed to the terminals 631~638 and 641~648 in the node devices 603, 604, and the signals are relayed and enter the node device 601. When the headers of the packets are detected by the separation and insertion units of the node device 601, the detected terminal numbers and the stored terminal numbers agree. As a result, the gate 403 is opened and the gate 402 is closed so that the packets are output solely in the direction of the terminals. Accordingly, the packets that have been output in the directions of the terminals from the separation and insertion units 201~208 are sent to the terminals 611~618 via the subordinate transmission lines and the packets are transmitted to all terminals of the network.

Third Embodiment

A third embodiment of the present invention will now be described. In this embodiment, the construction of the buffers and the method of controlling readout from the buffers differ from those of the foregoing embodiment. This embodiment is similar to the first embodiment in other aspects and can be applied to the arrangement of the second embodiment as well.

Figure 10:
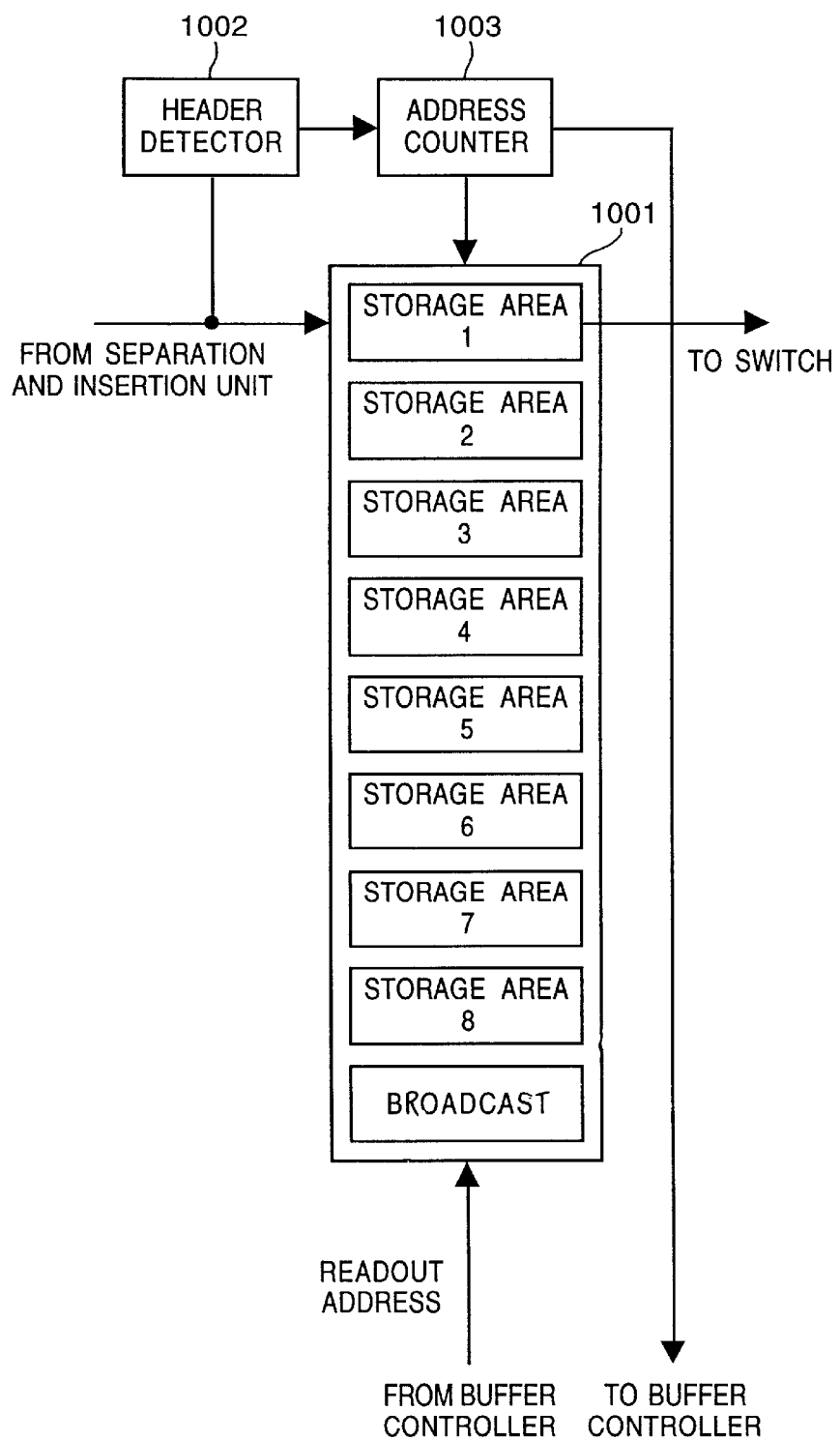
FIG. 10 is a diagram showing the internal construction of a buffer in a third embodiment.

FIG. 10 is a diagram showing the internal construction of each of the buffers 211~218 in this embodiment. As shown in FIG. 10, each buffer includes a buffer memory 1001 comprising storages areas 1~8 corresponding to the output terminals of the switch 241 and a storage area for broadcast, a header detector 1002 for detecting the B, N, T bits from the header of a packet, and an address counter 1003 for supplying the buffer memory 1001 with a write address.

When the B bit is "1" and the detected node number agrees with its own stored node number, the header detector 1002 causes the address counter 1003 to generate a write address to store the packet in the buffer memory 1001 in such a manner that the packet will be stored in the broadcast storage area. As a result, when the buffer controller 243 is notified by the address counter 1003 of the fact that the packet has been stored in the broadcast storage area, the controller performs control in such a manner that packets are read out of the broadcast storage area continuously, the number of packets being equivalent to the number of transmission channels, at a priority higher than that at which packets are read out of the other storage areas. In other words, control is performed in such a manner that whenever addresses change successively from A1~A8, packets are read out repeatedly eight times from the broadcast storage area.

The broadcast packets successively read out of the buffer 212 in this manner enter from one input terminal of the switch 241, the packets are output from all of the output terminals OUT1~OUT8 and are sent to the transmission lines 231~238 in succession. The packets are then transmitted to all terminals of the network in a manner similar to that described in conjunction with the foregoing embodiments.

Fourth Embodiment

In each of the embodiments described above, the node device to which the terminal that is the source of a broadcast packet is connected is the device that duplicates and outputs the broadcast packet in number of copies the same as that of the number of channels. In this embodiment, a node device that is not the node device to which the terminal that is the source of a broadcast packet is connected duplicates the broadcast packet to produce a number of copies equivalent to the number of channels. More specifically, the terminal that is the source of a broadcast packet adds information, which designates the node device that is to duplicate the broadcast packet in a number of copies equivalent to the number of channels, to the broadcast packet of FIG. 7 and then outputs the packet. For example, a situation will be considered in which the terminal 611 connected to the node 601 broadcasts a packet to each terminal. Assume here that the node device 603 is designated as the node device which duplicates the broadcast packet. The terminal 611 writes a bit, which designates the node device 603, in a field of the packet that designates the broadcast-packet duplicating node device, and then outputs this packet to the node device 601. The latter detects the header of the packet that has entered from the terminal 611. Since the packet is a broadcast packet and this node device per se has not be designated as the duplicated node device, this packet is output to the node device 602 over any channel. Since the node device 602 also has not been designated as the duplicating node device, the node device 602 outputs the packet to the node device 603 over any channel. Since the node device 603 has been designated as the duplicating node device, this node device performs the control described in the first and third embodiments and outputs the packet over all of the transmission channels. At such time the node device 603 activates the bit in the broadcast packet that indicates that duplication has been completed. Output to the terminal side and output on a channel the same as the input channel are carried out in the node devices 604, 601, 602 in the same manner as described in the foregoing embodiments, and the broadcast packet enters the node device 603 over all channels. The separation and insertion unit of the node device 603 outputs the broadcast packet solely to the terminal side since the node designated to duplicate the broadcast packet is the node device 603 per se and the bit indicating that duplication has been completed has been activated. This completes the broadcast.

According to this embodiment, the node device which duplicates the broadcast packet in a number of copies equivalent to the number of channels can be designated. As a result, by designating the duplicating node device in dependence upon the operating status of each node device or the state of use of the transmission channels, it is possible to disperse the load involved in making copies of the broadcast packet the number of which is equivalent to the number of channels.

Fifth Embodiment

In the fourth embodiment, the terminal that is the source of broadcast designates the duplicating node device. However, at least any single node device can be decided upon beforehand as the duplicating device. Assume here that the node device decided upon beforehand as the duplicating device is the node device 603. In this embodiment, it will suffice if only the node device 603, which is the duplicating node device, has buffers of the kind shown in FIG. 8 or FIG. 10 for duplicating the broadcast channel to produce a number of copies equivalent to the number of channels. The other node devices need only have buffers of the kind shown in FIG. 5.

In this embodiment also it is considered that the terminal 611 connected to the node 601 broadcasts a packet to each terminal. The terminal 611 outputs the broadcast packet to the node device 601. The latter detects the header of the packet that has entered from the terminal 611. Since this packet is the broadcast packet, it is output to the node device 602 over any channel. Since the node device 602 also has not been designated as the duplicating node device, the node device 602 outputs the packet to the node device 603 over any channel. Since the node device 603 has been designated as the duplicating node device, this node device performs the control described in the first or third embodiment and outputs the packet over all of the transmission channels. Output to the terminal side and output on a channel the same as the input channel are carried out in the node devices 604, 601, 602 in the same manner as described in the foregoing embodiments, and the broadcast packet enters the node device 603 over all channels. Since the duplicating node device is assumed to be only one in the network according to this embodiment, the separation and insertion units of the node device 603 need not have the function for outputting the entered packet to both the terminal side and buffer side simultaneously; the broadcast packet is output to the terminal side only. Doing so ends the broadcast operation. According to this embodiment, the construction of each node device can be simplified because the node devices need not have the function for making copies of the broadcast packets in a number equivalent to the number of channels.

In accordance with the present invention described above by citing embodiments thereof, there is provided a network system (particularly a network system in which one terminal is not connected to all transmission channels) in which terminals are connected to a plurality of transmission channels via a node device and a plurality of the node devices are connected in the form of a ring by the plurality of transmission channels, wherein when broadcast communication is carried out, any one node device duplicates a broadcast packet in a number equivalent to the total number of transmission channels and outputs the broadcast packet over all of the transmission channels, each node device distributes the broadcast packet to the terminal side and each node device also outputs the broadcast packet over all of the transmission channels. The broadcast packets are terminated at the node device that duplicated the broadcast packets in the number equivalent to the total number of transmission channels. Since the transmitting terminal need only duplicate one broadcast packet, the burden upon the transmitting terminal and overall network is alleviated.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing program codes for performing the aforesaid functions of the foregoing embodiments to a system or an apparatus, reading the program codes with a computer (e.g., a CPU or MPU) of the system or apparatus from the storage medium, and then executing the program.

In this case, the program codes read from the storage medium implement the functions according to the embodiments, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiment are implemented by executing the program codes read by a computer, it goes without saying that the present invention covers a case where an operating system (OS) or the like working on the computer performs a part of or the entire process in accordance with the designation of program codes and implements the functions according to the embodiments.

Furthermore, it goes without saying that the present invention further covers a case where, after the program codes read from the storage medium are written to a function extension board inserted into the computer or to a memory provided in a function extension unit connected to the computer, a CPU or the like contained in the function extension board or function extension unit performs a part of or the entire process in accordance with the designation of program codes and implements the function of the above embodiments.

Thus, in accordance with the embodiments described above, it is possible to lighten the load upon the transmitting terminal and network.

As many widely different embodiments of the present invention can be made without departing from the spirit and scope thereof, it is to be understood that the invention is not limited to the specific embodiments thereof except as defined in the appended claims.

What is claimed is:

1. A network system for connecting a plurality of node devices by a plurality of parallel transmission channels, at least one of said node devices comprising:
   a discrimination section for discriminating whether or not transmission data is broadcast data;
   a duplication section for duplicating the transmission data, if it is discriminated that the transmission data is broadcast data by said discrimination section;
   a plurality of memory sections for storing transmission data, said plurality of memory sections respectively dedicated to a plurality of transmission channels;
   a control section for controlling storage of the duplicated transmission data in each memory section, such that identical broadcast data is transmitted via each of the plurality of the transmission channels; and
   a switch for connecting said plurality of memory sections to transmission channels that differ from one another and for changing over the transmission channel to which each of the memory sections is connected.

2. The system according to claim 1, wherein terminals, each of which correspond to a respective transmission channel, are connected to one of the node devices and are connected to the transmission channels via a separating section provided within each of said node devices, said separating section having a function for distributing entered data, which enters from a transmission channel, to a side downstream of the transmission channel and to a side on which the terminal is connected.

3. The system according to claim 2, wherein said separating section has a selecting section for selecting, in dependence upon information described in the entered data, whether the entered data is to be output to the side on which the terminal is connected without being output to the side downstream of the transmission channel, or whether the entered data is to be output to the side downstream of the transmission channel without being output to the side on which the terminal is connected, or whether the entered data is to be distributed to the side downstream of the transmission channel and to the side on which the terminal is connected.

4. A network system for connecting a plurality of node devices by a plurality of parallel transmission channels, at least one of said node devices comprising:
   a discrimination section for discriminating whether or not data to be transmitted is broadcast data;
   a plurality of memory sections for storing transmission data, said plurality of memory sections respectively dedicated to a plurality of transmission channels;
   a memory control section for storing transmission data in any memory section of the plurality of memory sections upon distinguishing the broadcast data from other data, based on a discrimination by said discrimination section, and outputting identical broadcast data repeatedly whenever each of the plurality of transmission channels is selected as an output channel from the memory section storing the transmission data; and
   a switch for connecting said plurality of memory sections to transmission channels that differ from one another and for changing over the transmission channel to which each of the memory sections is connected.

5. The system according to claim 4, wherein terminals, each of which correspond to a respective transmission channel, are connected to one of the node devices and are connected to the transmission channel via a separating section provided within each of said node devices, said separating section having a function for distributing entered data, which enters from a transmission channel, to a side downstream of the transmission channel and to a side on which the terminal is connected.

6. The system according to claim 5, wherein said distributing section has a selecting section for selecting, in dependence upon information described in the entered data, whether the entered data is to be output to the side on which the terminal is connected without being output to the side downstream of the transmission channel, or whether the entered data is to be output to the side downstream of the transmission channel without being output to the side on which the terminal is connected, or whether the entered data is to be distributed to the side downstream of the transmission channel and to the side on which the terminal is connected.

7. A network system for connecting a plurality of node devices by a plurality of parallel transmission channels, at least one of said node devices comprising:

a discrimination section for discriminating whether or not transmission data is broadcast;

a duplication section for duplicating the transmission data, if it is discriminated by said discrimination section that the transmission data is broadcast data;

a plurality of memory sections for storing transmission data, said plurality of memory sections respectively dedicated to a plurality of transmission channels;

a control section for controlling storage of the duplicated transmission data in each memory section, such that identical broadcast data is transmitted via each of the plurality of the transmission channels;

a plurality of variable channel transmitting sections for outputting the transmission data, which has been stored in each of said memory sections, over any of the plurality of transmission channels; and a control section for controlling said plurality of variable channel transmitting sections in such a manner that each of the transmission channels over which the transmission data is output by respective said plurality of variable channel transmitting sections is different from one another.

8. The system according to claim 7, wherein the plurality of transmission channels are multiplexed.

9. The system according to claim 8, wherein the plurality of node devices are connected in a ring by the plurality of transmission channels.

10. A network system for connecting a plurality of node devices by a plurality of parallel transmission channels, at least one of said node devices comprising:

a discrimination section for discriminating whether or not data to be transmitted is broadcast data;

a plurality of memory sections for storing transmission data, said plurality of memory sections respectively dedicated to a plurality of transmission channels;

a memory control section for storing transmission data in an memory section of said plurality of memory sections upon distinguishing broadcast data from other data, based on a discrimination by said discrimination section, and outputting identical broadcast data repeatedly whenever each of the plurality of transmission channel is selected as an output channel from the memory section storing the transmission data;

a plurality of variable channel transmitting sections for outputting the data, which has been stored in each of said memory sections, over any of the plurality of transmission channels; and a control section for controlling said plurality of variable channel transmitting section in such a manner that each of the transmission channels over which the data is output by respective said plurality of variable channel transmitting sections is different from one another.

11. The system according to claim 10, wherein the plurality of transmission channels are multiplexed.

12. The system according to claim 11, wherein the plurality of node devices are connected in a ring by the plurality of transmission channels.

13. A communication method in a network system for connecting a plurality of node devices by a plurality of parallel transmission channels and connecting terminals to respective ones of the plurality of transmission channels via the node devices, comprising the steps of:

in a first node device, which is any one of said plurality of node devices, duplicating broadcast data, storing each of the duplicated broadcast data in correspondence to different transmission channels, and outputting the duplicated broadcast data to be transmitted over all of the plurality of transmission channels; and in other node devices, outputting the broadcast data, which enters over all of the transmission channels, to terminals connected to each of the transmission channels via the other node devices, and outputting the broadcast data over all of the transmission channels so that identical broadcast data is transmitted to adjacent node devices.

14. The method according to claim 13, wherein the plurality of node devices are connected in a ring by the plurality of transmission channels, and the broadcast data, which enters the first node device via the other node devices upon being duplicated by the first node device, is terminated at the first node device.

15. The method according to claim 14, wherein the other node devices duplicate the broadcast data entered by each transmission channel, output entered data by a transmission channel that is the same as the transmission channel over which the broadcast data was transmitted, and output other entered data to a terminal connected to this transmission channel via its own node device.

16. The method according to claim 15, wherein the first node device temporarily stores the duplicated broadcast data by allotting the broadcast data according to each transmission channel.

17. A communication method in a network system for connecting a plurality of node devices by a plurality of parallel transmission channels and connecting terminals to respective transmission channels of the plurality of transmission channels via the node devices, comprising the steps of:

in a first node device, which is any one of said plurality of node devices, duplicating first data, which is data to be transmitted to a plurality of terminals, and outputting the duplicated first data over the plurality of transmission channels; and in other node devices, outputting the first data, which enters over all of the transmission channels, to terminals connected to each of the transmission channels via these node devices per se, and outputting the first data over all of the transmission channels, wherein the plurality of node devices are connected in a ring by a plurality of transmission channels, and the first data, which enters said first node device via the other node devices upon being duplicated by said first node device and output over all of the transmission channels, is terminated at said first node device, wherein the other node devices duplicate the first data entered by each transmission channel, output one by a transmission channel the same as the transmission channel over which the first data was transmitted, and output another one to a terminal connected to this transmission channel via its own node device, and wherein the first node device temporarily stores the first data in advance, duplicates the first data by repeatedly reading out the temporarily stored first data and outputs the first data over all transmission channels.

18. The method according to claim 17, wherein the first node device is a node device to which a terminal that is a source of transmission of the first data is connected.

19. The method according to claim 17, wherein the first node device is a node device designated by a terminal that is a source of transmission of the first data.

20. The method according to claim 17, wherein the first node device is a predetermined node device among said plurality of node devices.

21. A node device comprising:

a discrimination section for discriminating whether or not transmission data is broadcast data;

a duplication section for duplicating the transmission data, if it is discriminated that the transmission data is the broadcast data by said discrimination section;

a plurality of memory sections for storing transmission data, the plurality of memory sections respectively dedicated to a plurality of transmission channels;

a control section for controlling storage of the data duplicated in each memory section such that identical broadcast data is transmitted via each of the plurality of the transmission channels; and a switch for connecting said plurality of memory sections to transmission channels that differ from one another and for changing over the transmission channel to which each of the memory sections is connected.

22. A node device, comprising:

a discrimination section for discriminating whether or not data to be transmitted is broadcast data;

a plurality of memory sections for storing transmission data, wherein the plurality of memory sections are respectively dedicated to a plurality of transmission channels;

a memory control section for storing transmission data in any memory section of the plurality of memory sections upon distinguishing the broadcast data from the other data, based on a discrimination by said discrimination section, and outputting identical broadcast data repeatedly whenever each of the plurality of transmission channels is selected as an output channel from the memory section storing the transmission data; and a switch for connecting said plurality of memory sections to transmission channels that differ from one another and for changing over the transmission channel to which each of the memory sections is connected.

23. A node device comprising:

a discrimination section for discriminating whether or not transmission data is broadcast data;

a duplication section for duplicating the transmission data, is it is discriminated by said discrimination section that the transmission data is broadcast data;

a plurality of memory sections for storing transmission data, said plurality of memory sections respectively dedicated to a plurality of transmission channels;

a control section for controlling storage of the data duplicated in each memory section such that identical broadcast data is transmitted via each of the plurality of the transmission channels;

a plurality of variable channel transmitting sections for outputting the transmission data, which has been stored in each of said memory sections, over any of the plurality of transmission channels; and a control section for controlling said plurality of variable channel transmitting sections in such a manner that each of the transmission channels over which the transmission data is output by respective said plurality of variable channel transmitting sections is different from one another.

24. A node device comprising:

a discrimination section for discriminating whether or not data to be transmitted is broadcast data;

a plurality of memory sections for storing transmission data, said plurality of memory sections respectively dedicated to a plurality of transmission channels;

a memory control section for storing transmission data in any memory section of said plurality of memory sections upon distinguishing the broadcast data from other data, based on a discrimination by said discrimination section, and outputting identical broadcast data repeatedly whenever each of the plurality of transmission channels is selected as an output channel from the memory section storing the transmission data;

a plurality of variable channel transmitting sections for outputting the data, which has been stored in each of said memory sections, over any of the plurality of transmission channels; and a control section for controlling the plurality of variable channel transmitting sections in such a manner that each of the transmission channels over which the data is output by respective said plurality of variable channel transmitting sections is different from one another.

* * * * *